US010059211B2

United States Patent
Jefferies et al.

(10) Patent No.: US 10,059,211 B2
(45) Date of Patent: Aug. 28, 2018

(54) ELECTRIC VEHICLE CHARGING STATION HANDLE INPUT

(71) Applicant: SCHNEIDER ELECTRIC USA, INC., Schaumburg, IL (US)

(72) Inventors: Kevin M. Jefferies, Raleigh, NC (US); Benjamin W. Edwards, Rolesville, NC (US); Matthew L. White, Raleigh, NC (US); Konstantin A. Filippenko, Grenoble (FR)

(73) Assignee: Schneider Electric USA, Inc., Andover, MA (US)

( * ) Notice: Subject to any disclaimer, the term of this patent is extended or adjusted under 35 U.S.C. 154(b) by 276 days.

(21) Appl. No.: 14/904,745

(22) PCT Filed: Aug. 2, 2013

(86) PCT No.: PCT/US2013/053452
§ 371 (c)(1),
(2) Date: Jan. 13, 2016

(87) PCT Pub. No.: WO2015/016946
PCT Pub. Date: Feb. 5, 2015

(65) Prior Publication Data
US 2016/0159231 A1    Jun. 9, 2016

(51) Int. Cl.
*H02J 7/00*        (2006.01)
*B60L 11/18*       (2006.01)

(52) U.S. Cl.
CPC ....... *B60L 11/1818* (2013.01); *B60L 11/1824* (2013.01); *B60L 11/1838* (2013.01);
(Continued)

(58) Field of Classification Search
USPC ........................................................ 320/109
See application file for complete search history.

(56) References Cited

U.S. PATENT DOCUMENTS

2010/0318250 A1  12/2010  Mitsutani
2012/0048983 A1*  3/2012  Bianco ................ B60L 11/1818
                                          242/388.9
(Continued)

FOREIGN PATENT DOCUMENTS

CN    101803147    8/2010
CN    103138326    6/2013
(Continued)

OTHER PUBLICATIONS

English Language Machine Translation of Chinese Patent Publication No. CN103138326, published on Jun. 5, 2013, 41 pages.
(Continued)

*Primary Examiner* — Robert Grant
(74) *Attorney, Agent, or Firm* — Locke Lord LLP

(57) ABSTRACT

An electric vehicle supply equipment includes EVSE control electronics, an EV connector and an HMI circuit, the HMI circuit including a proximity input terminal configured to receive a proximity signal from an EV connector indicating a state of a handle button of the EV connector, a ground terminal, a current source input coupled between the proximity input terminal and the ground terminal, a comparator connected between the proximity input terminal and the ground terminal to provide an output representing a state of the handle button when the current source is activated by the control input and an output terminal to which the output of the comparator is connected, the output terminal being connected to the EVSE control electronics, wherein the state of the handle button is utilized as an input to the HMI circuit.

19 Claims, 9 Drawing Sheets

(52) U.S. Cl.
CPC ......... *B60L 11/1846* (2013.01); *H02J 7/0027* (2013.01); *B60L 2230/16* (2013.01); *B60L 2230/40* (2013.01); *B60L 2240/80* (2013.01); *Y02T 10/7005* (2013.01); *Y02T 10/7055* (2013.01); *Y02T 10/7088* (2013.01); *Y02T 90/121* (2013.01); *Y02T 90/128* (2013.01); *Y02T 90/14* (2013.01); *Y02T 90/163* (2013.01); *Y02T 90/168* (2013.01); *Y02T 90/169* (2013.01); *Y04S 30/12* (2013.01); *Y04S 30/14* (2013.01)

(56) References Cited

U.S. PATENT DOCUMENTS

| | | | |
|---|---|---|---|
| 2012/0091958 A1 | 4/2012 | Ichikawa et al. | |
| 2012/0126747 A1* | 5/2012 | Kiko | B60L 3/0069 320/109 |
| 2012/0217928 A1* | 8/2012 | Kulidjian | B60L 3/0069 320/109 |
| 2013/0120889 A1* | 5/2013 | Klesyk | B60L 3/0069 361/87 |
| 2013/0190968 A1* | 7/2013 | Nitzberg | G07C 3/00 701/31.6 |

FOREIGN PATENT DOCUMENTS

| | | |
|---|---|---|
| DE | 102010014417 | 10/2011 |
| JP | 2009194958 | 8/2009 |

OTHER PUBLICATIONS

English Language Machine Translation of Chinese Patent Publication No. CN101803147, published on Aug. 11, 2010, 38 pages.
International Search Report and Written Opinion for PCT/US2013/053452, dated Jan. 9, 2014, 16pp.
English Language Machine Translation of German Patent Application Publication No. DE102010014417 published on Oct. 13, 2011, 11 pages.
English Language Machine Translation of Japanese Patent Application Publication No. JP2009194958 published on Aug. 27, 2009, 19 pages.
Extended European Search Report for EP Patent Application Publication No. 13890288.7, dated Mar. 15, 2017, 9 pages.

* cited by examiner

ELECTRIC VEHICLE CHARGING STATION HANDLE INPUT

FIELD OF THE INVENTION

The present disclosure pertains generally to charging devices and systems for charging an electric vehicle.

BACKGROUND

FIGS. 1-2 represents an example of a conventional SAE J1772 (October 2012 Rev.) electric vehicle (EV) charging system 10 comprising an electric vehicle supply equipment (EVSE) 30, an EV connector 50, an EV charging receptacle 70, and an electric vehicle 90 (e.g., EVs, PHEVs, etc.). The EVSE 30 receives AC electric power at various nominal voltages and a frequency of 60 Hz (in the United States) from a utility grid or other power source and transfers it to the electric vehicle 90 battery 95 through a cord 35 and EV connector 50 that plugs into a mating EV charging receptacle 70 on the vehicle. The EVSE 30 can convert the grid AC power to DC output power, which is then provided to the electric vehicle 90, or alternatively, the EVSE could output AC power, to be converted to DC power internally by an EV on-board charger (not shown).

FIG. 2 shows an example of a conventional SAE J1772 EV connector 50. As is described in US 2011/0169447 A1, for example, the handle button 55 and the latch 51 are mechanically linked (e.g., by a spring-biased, pivoting lever) so that depression of the handle button 55 causes the latch 51 to move upwardly to permit insertion of (or removal of) the EV connector 50 into (or from) the corresponding EV charging receptacle 70. The latch 51 engages a corresponding, mating member in the EV charging receptacle 70 (e.g., a flange, detent, etc.) when the handle button 55 is released with the EV connector 50 inserted into the EV charging receptacle 70 and, in the engaged position, this positive engagement prevents inadvertent decoupling.

Five contacts C1-C5 are depicted at the head of the EV connector 50. The contacts C1-C5 includes conductive elements that mate with corresponding conductive elements (not shown) in the EV charging receptacle 70 to provide an electrical path therebetween. Contact C4, for example, enables basic two-way communications between the EVSE 30 and the vehicle 90 via a control pilot signal.

The function of the handle button 55 is to control the latch 51 holding the EV connector 50 in the EV charging receptacle 70. Contacts C3 and C5 at the EV connector 50 to EV charging receptacle 70 interface indicate to the EVSE 30 when the EV connector 50 is properly connected to an EV charging receptacle 70. Contact C3 is electrically connected to the EVSE 30 equipment ground and to the vehicle chassis ground. As set forth in SAE J1772, Section 4.2.2, opening of the handle button 55 should trigger the vehicle charge control to provide a controlled shutoff or charge power prior to disconnection. As set forth in SAE J1772, Section 6.2.2, the EVSE monitors its proximity circuit and charging is only allowed when the EVSE detects a valid proximity circuit voltage with no faults and with the handle button 55 switch closed.

FIG. 3 shows, in accord with the SAE J1772 standard, a conventional proximity detection circuit enabling verification of the mechanical connection between the EV 90 and the EVSE 30. The implementation details of proximity detection are, however, left to the discretion of the manufacturer. The handle button 55 is a part of this proximity detection circuit and is normally closed, except when the connector latch 51 is actuated to decouple the connector from the EV charging receptacle 70.

FIG. 4 shows a representation of a conventional AC Level 2 system configuration (Nominal Supply Voltage (V) of 208 to 240 VAC, less than or equal to 80 A continuous) including the circuit of FIG. 3, as disclosed in the SAE J1772 standard (October 2012 Rev.). AC power from an electric supply is provided to an on-board charger 91 using an appropriate EV connector 30 and cord set. The EVSE 30 provides required ground fault protection (GFI) 34 between the electric supply and the vehicle 90. If there is a non-symmetrical impedance connection between the onboard power electronics and the vehicle frame ground, it will be picked up by the GFI sense coil 34 in the EVSE 30. If the connection generates a current that is above a pre-determined threshold, the EVSE control electronics 32 will cause the contactor/relay 36 to break the electrical connection between lines L1, L2, connected to the power grid, and the vehicle 90.

The SAE J1772 standard specifies some minimal human-machine interface (HMI) between the EVSE 30 and the user, such as a required "power-on indication" or "AC Present" indicator (SAE J1772 4.6.5) that the EVSE is connected to AC main power and a "charge status indicator" (SAE J1772 4.2.2.3) providing charge status information visible to the operator while inserting the EV connector 50 into the EV charging receptacle 70. Additional HMI functions to extend the capabilities of the EVSE 30 may be provided at the discretion of the EVSE manufacturer and may include buttons, keypads, touch screens, or the like, to enable a user to set a charging time, set a charging delay, or to enable display functions such as the display of a charging current. For example, some commercially available EVSE HMIs allow the user to set a charging delay when connecting their electric vehicle 90 (e.g., EVs, PHEVs, etc.) to the EVSE 30 to allow the user to avoid peak demand billing rates.

BRIEF SUMMARY

In accord with the present disclosure, a new HMI circuit (see, e.g., FIGS. 5-6) is added into the proximity circuit wiring within the EVSE 30 to add additional functionality to the handle button that does not currently exist. This HMI circuit is configured to utilize a user's manipulation of the handle button 55 as an input to EVSE 30 control electronics and software. For example, an EVSE 30 display (FIGS. 8A-8B) displays charging-related choices or options to the user and the user can use the handle button to navigate through and/or select one or more of the choices or options simply by pressing the handle button 55 of the EV connector 50. This HMI circuit provides additional options for entry of instructions to the EVSE and broadens the HMI of the charging system. Moreover, the disclosed HMI circuit provides enhanced EVSE functionality with little added cost and without rearrangement of or redesign of conventional EVSEs (e.g., without requiring the added components and cost of dedicated HMI buttons, keypad or touch screen interfaces). The present disclosure allows a novel re-use of the existing EV connector handle button, a required component of the standard EV-EVSE interface, to achieve an EVSE HMI. An EVSE HMI is achieved using existing, standard components of the EVSE in a novel way.

According to an implementation of the present disclosure, an EVSE human machine interface (HMI) circuit 100, disposed in an EVSE, includes a control pilot input terminal configured to receive a control pilot signal from EVSE control electronics to indicate whether an EV connector is plugged into a receptacle of an electric vehicle. The HMI circuit 100 also includes a proximity input terminal configured to receive a proximity signal from an EV connector indicating a state of a handle button of the EV connector when the control pilot signal indicates that the EV connector is not connected to an EV receptacle. The HMI circuit also includes a ground terminal, a current source having a control input connected to the control pilot input terminal and electrically coupled between the proximity input terminal and the ground terminal. The HMI circuit also includes an output terminal and a comparator circuit connected between the proximity input terminal and the ground terminal and having an output connected to the output terminal to indicate a state of the handle button when the current source is activated by the control input. The state of the handle button is utilized as an input to the HMI circuit.

In another aspect of the present concepts, an EVSE includes an EV connector comprising a proximity detection circuit, the proximity detection circuit including a handle button and a proximity signal input line to the EVSE. The EVSE also includes an EVSE HMI circuit having a comparator. The comparator includes an output terminal, a first input terminal electrically connected to ground, and a second input terminal electrically connected to the proximity signal input line. A current source input line is configured to inject current into a loop formed between the ground and the proximity signal input line. When the EV connector is not connected to an EV receptacle, the EVSE HMI circuit comparator outputs a first output when the handle button of the EV connector is activated and outputs a second output different from the first output when the handle button of the EV connector is not activated.

In another aspect, an EVSE includes EVSE control electronics and an EV connector, the EV connector comprising a proximity detection circuit, the proximity detection circuit comprising a handle button disposed between a proximity detection terminal and a ground terminal of the EV connector, the EV connector proximity detection circuit configured to detect a connection between the EV connector and an electric vehicle and to output a signal to the EVSE control electronics indicative of the connection. The EVSE also includes an HMI circuit configured, when the EV connector is not connected to an EV receptacle, to output a first output when the handle button of the EV connector is activated and to output a second output when the handle button of the EV connector is not activated.

The foregoing and additional aspects and implementations of the present disclosure will be apparent to those of ordinary skill in the art in view of the detailed description of various implementations and/or aspects, which is made with reference to the drawings, a brief description of which is provided next.

BRIEF DESCRIPTION OF THE DRAWINGS

The foregoing and other advantages of the invention will become apparent upon reading the following detailed description and upon reference to the drawings.

Figure 1:
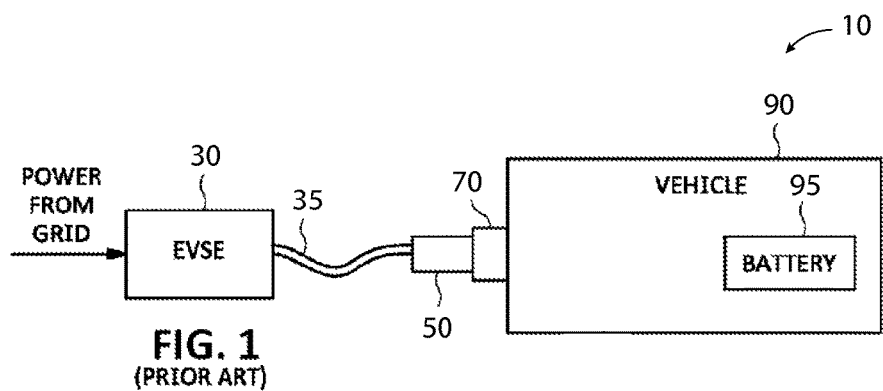
FIG. 1 represents an example of a conventional electric vehicle charging system.
Figure 2:
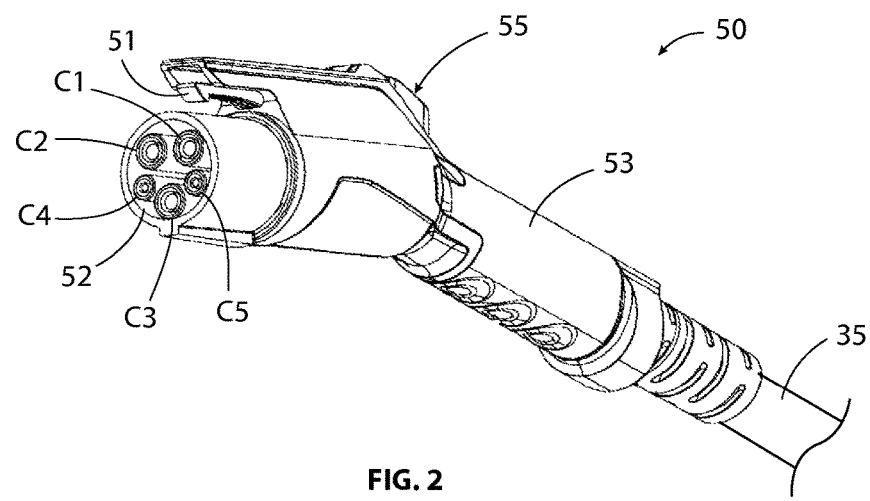
FIG. 2 depicts an example of a conventional EVSE EV connector.
Figure 3:
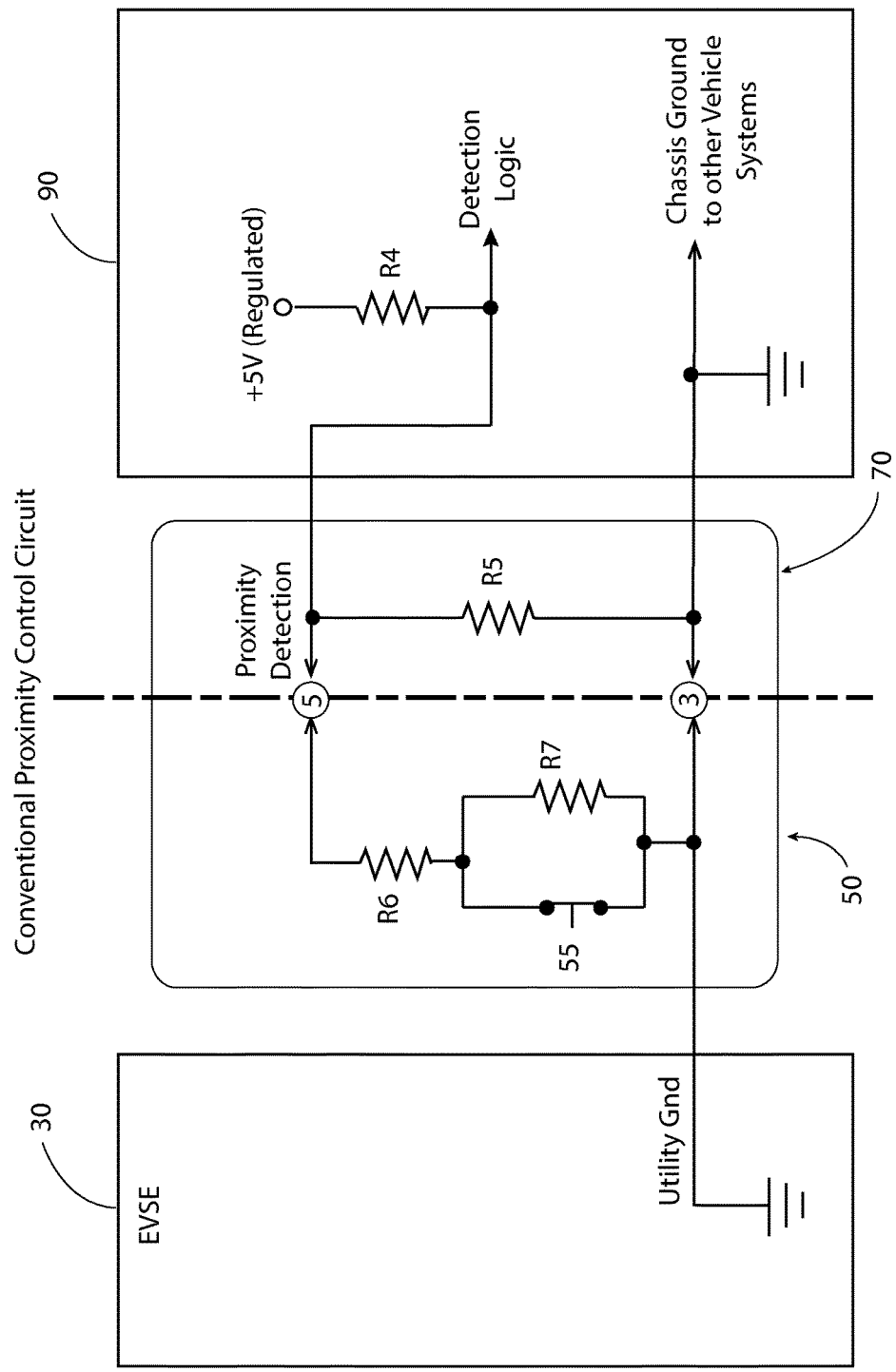
FIG. 3 depicts an example of a conventional proximity detection circuit.

While the present disclosure is susceptible to various modifications and alternative forms, specific implementations have been shown by way of example in the drawings and will be described in detail herein. It should be understood, however, that the present disclosure is not intended to be limited to the particular forms disclosed. Rather, the present disclosure covers all modifications, equivalents, and alternatives falling within the spirit and scope of the invention as defined by the appended claims.

DETAILED DESCRIPTION

As noted above, the circuit formed along the proximity and ground conductors between the electric vehicle and EV connector 50 is used to detect the presence of the EV connector 50 in the EV charging receptacle 70, but there is currently no standard function or use for the proximity line at the EVSE.

Figure 4:
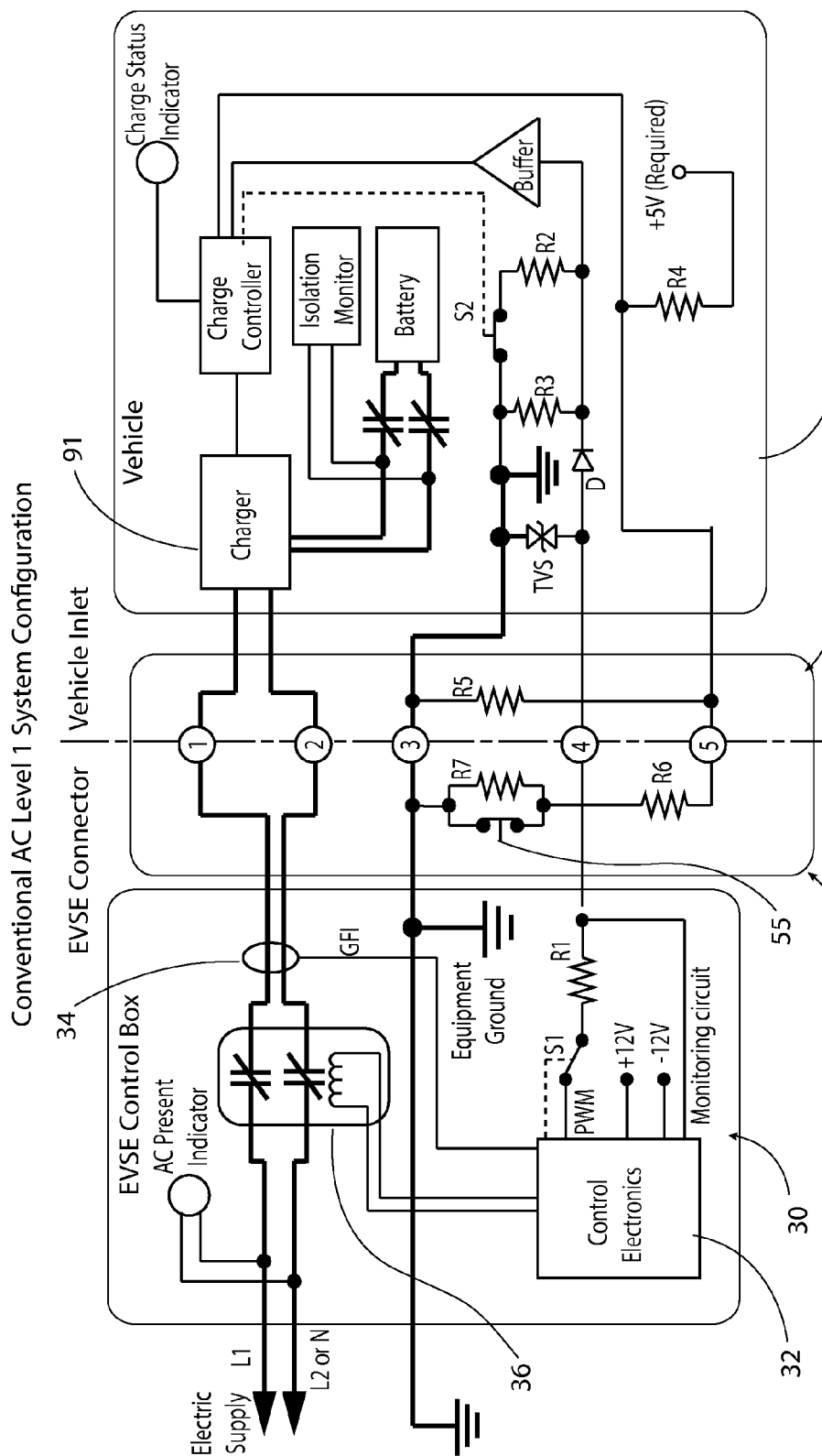
FIG. 4 depicts an example of a conventional AC Level 2 system configuration including the circuit of FIG. 3.
Figure 5:
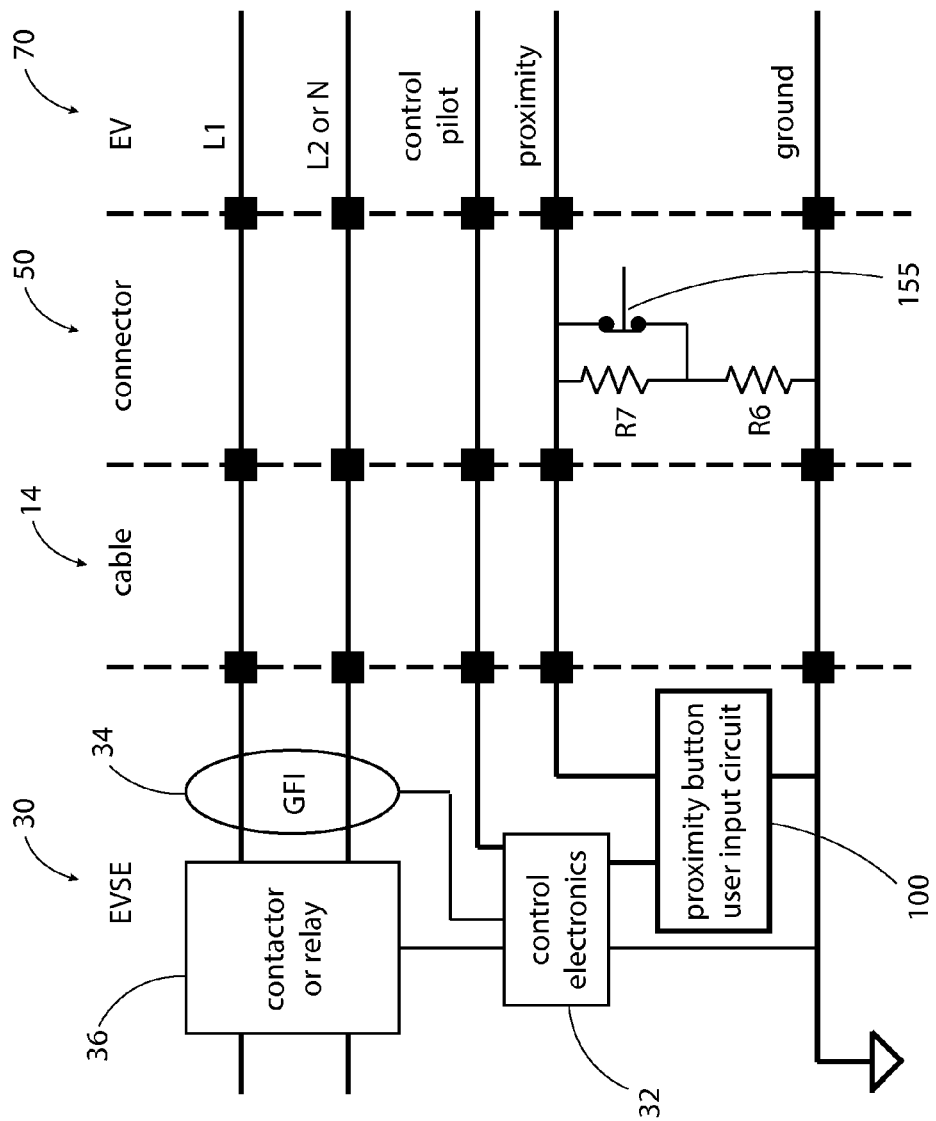
FIG. 5 is a representation of an HMI circuit in accord with at least some aspects of the present concepts.

FIG. 5 shows, from left to right, a basic schematic of the EVSE 30, cable 35, EV connector 50, and EV charging receptacle 70, and presents a simplified representation of FIG. 4's conventional AC Level 2 system configuration. However, in FIG. 5, an HMI circuit 100 is added into the proximity circuit wiring within the EVSE 30, making use of the proximity circuit connection between the EVSE 30 and the EV 90 via the EVSE connector 50 to EV charging receptacle 70 interface. Contactor/relay 36 and GFI 34 are provided on conductors L1/L2 (power) and are each connected to the EVSE control electronics 32. In accord with the present concepts, the addition of the HMI circuit 100 into the EVSE 30 proximity circuit wiring adds additional HMI functionality that does not currently exist. The HMI circuit 100 permits the EVSE control electronics 32 to read the state of the handle button 55 through a current loop comprising the proximity conductor(s) and ground conductor(s) and to interpret the user's manipulation of the handle button 55 as control inputs.

Figure 6:
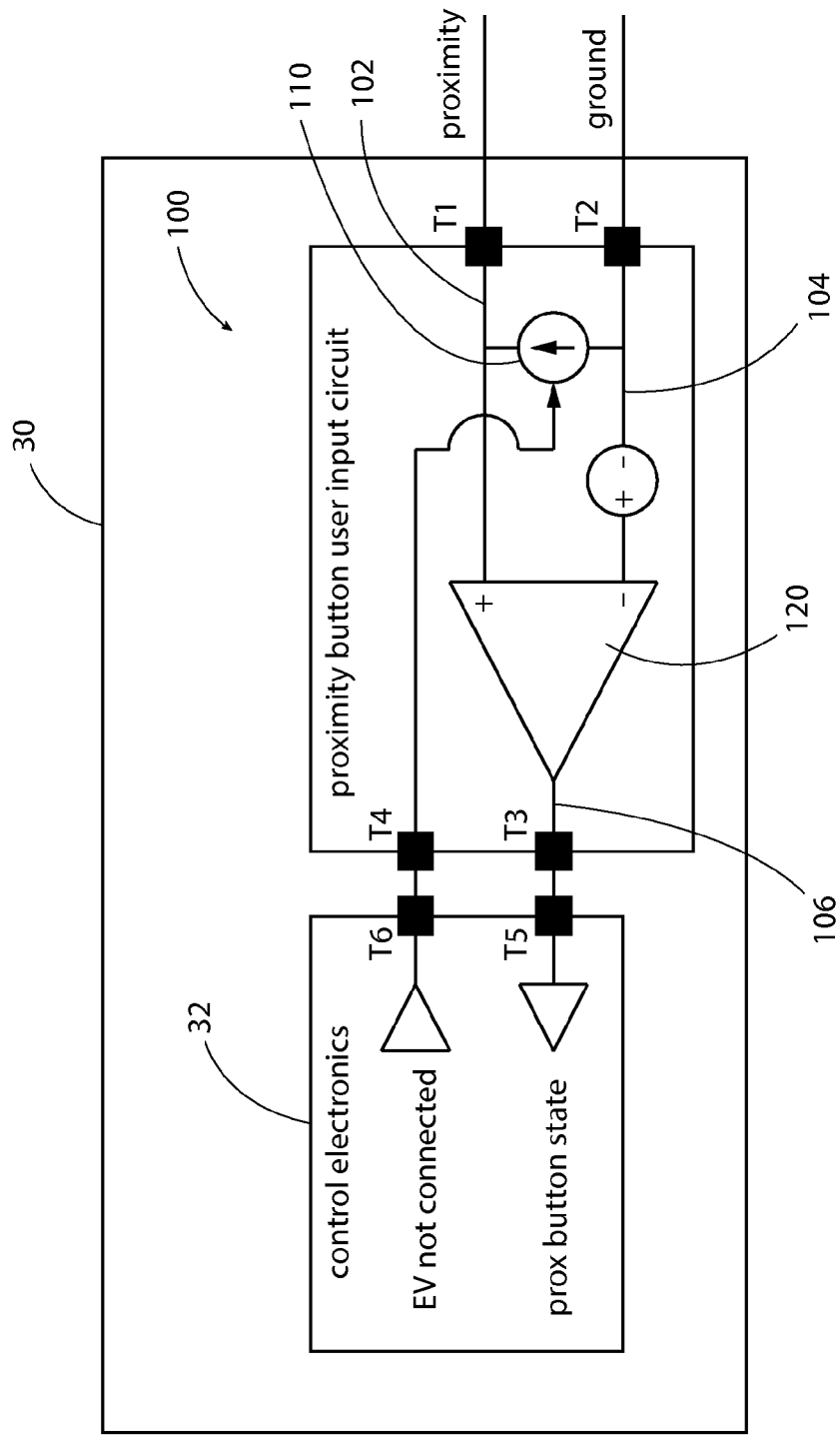
FIG. 6 is a representation of the HMI circuit depicted in FIG. 5 in accord with at least some aspects of the present concepts.

FIG. 6 shows a simplified representation of an EVSE 30 comprising a HMI circuit 100 in relation to the EVSE control electronics 32, proximity conductor, and ground conductor. The HMI circuit 100 includes a ground terminal T2 and a proximity input terminal T1, the proximity input terminal T1 being configured to receive a proximity signal from an EV connector 50 indicating a state of a handle button 55 of the EV connector when the control pilot signal indicates that the EV connector is not connected to an EV receptacle. The HMI circuit 100 also includes a comparator 120 having a positive input receiving a proximity input conductor 102 connected to the proximity input terminal T1 and having a negative input receiving a ground conductor 104 connected to the ground terminal T2. An output 106 of the comparator 120 is connected to an output terminal T3, which in turn provides an output to the EVSE control electronics 32. The HMI circuit 100 includes a current input terminal T4 configured to pass a current from terminal T6 of the EVSE control electronics 32 for injection at a point 110 between the proximity input conductor 102 and the ground conductor 104 when the EV connector 50 of the EVSE 30 is not plugged into an EV receptacle 70 of an electric vehicle 90.

In at least some aspects of the present concepts, the current injection is governed by the control pilot circuit defined in SAE J1772 4.2.1, which verifies the vehicle connection. The control pilot is the primary control conductor and performs the functions of verifying that the electric vehicle is present and connected, permitting energization/de-energization of the supply, transmitting supply equipment current rating to the vehicle, monitoring the presence of the equipment ground, and establishing vehicle ventilation requirements. To avoid interfering with the standard-defined function of the EV connector 50 handle button 55 (see SAE J1772, Section 4.2.2), the EVSE 30 advantageously monitors the state of the handle button and EV connector 50 to EV charging receptacle 70 plug interface so as to enable the HMI circuit 100 only when the EV connector is not connected to the EV charging receptacle.

The present concepts can alternatively implement other methods of detecting the connection to the EV 90. In one non-limiting example, a connection to an EV 90 is detected by measuring the voltage on the proximity line for connection to the proximity detection circuit implemented on the EV. The EV 90 implements a detection circuit which applies a stimulus to proximity, which is observed to detect connection of the EV. When the EV 90 is determined to be connected, the stimulus applied to measure the handle button 55 input is stopped.

The comparator 120 compares the net voltage difference between the ground conductor 104 and the proximity input conductor 102 to an expected value or range of values. To illustrate, in one configuration, when the handle button 55 is in an activated (e.g., depressed) state, reflecting an open switch position, the resistance (proximity-ground) is 480 Ohms and the output voltage V of the comparator 120 for a stimulus of 1 mA is about 0.48V. In contrast, when the handle button is in a de-activated (e.g., not depressed) state, reflecting a closed switch position, the resistance (proximity-ground) is 150 Ohms and the output voltage of the comparator 120 for a stimulus of 1 mA is about 0.15V. Thus, in this example, the activation of the handle button 55 causes the HMI circuit 100 comparator 120 to output a markedly higher voltage to the EVSE control electronics 32.

Although the above example thus describes one way to assess a state of the handle button 55, it is to be understood that the present concepts encompass other ways to assess the state of the handle button 55 and to use such assessed state, in combination with control logic and existing EVSE components, to obtain a new function without the added cost of dedicated HMI input components. Further, the example of FIG. 5 is intended to be illustrative, and the HMI circuit 100 may be advantageously installed or used in combination with any EVSE system, not just an AC Level 2 system. For example, the disclosed HMI circuit 100 may be utilized with any AC Level 1-3 system configuration or any DC Level 1-2 system configuration. Further, the present concepts are not limited to SAE J1772 and may be applied to any current or future standard utilizing an EV connector 50 handle button 55.

Figure 7:
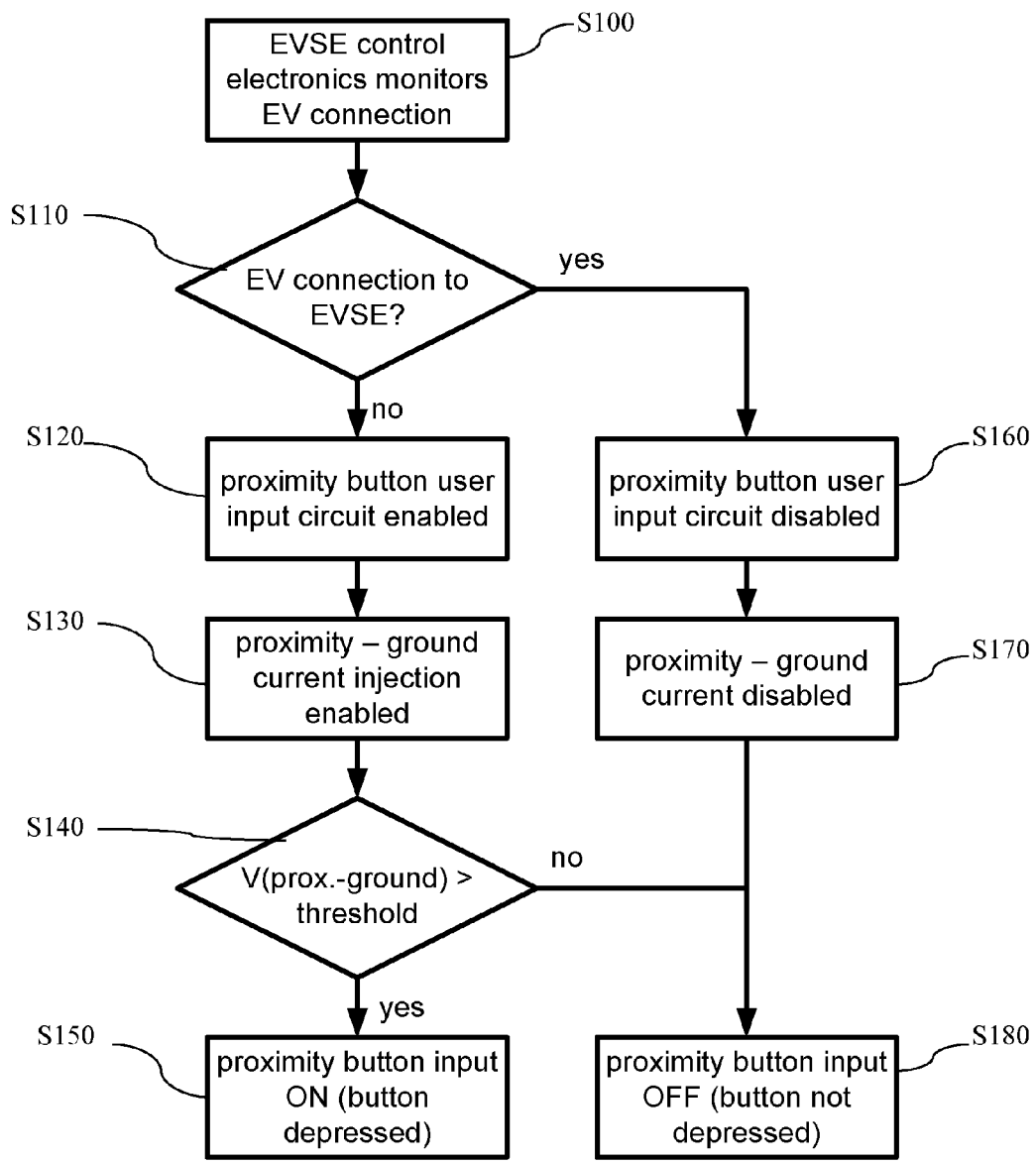
FIG. 7 depicts a flowchart of operation of the HMI circuit by an EVSE in accord with at least some aspects of the present concepts.

FIG. 7 shows depicts a simplified flowchart of the operation of the HMI circuit 100 in accord with at least some aspects of the present concepts. In block S100, the EVSE control electronics 32 continuously monitors the EV connector 50 (e.g., via the control pilot signal) to determine if it is connected to an EV charging receptacle 70 of an electric vehicle (see, e.g., FIG. 4; SAE J1772).

In block S110 of FIG. 7, the EVSE control electronics 32 determines whether the EV connector 50 is connected to an EV charging receptacle 70 of an electric vehicle 90. If the EV connector 50 is determined to be connected to an EV charging receptacle 70 of an electric vehicle 90, the EVSE control electronics 32 disables the HMI circuit 100 in block S160 so as not to interfere with the standard function of the handle button 55. In block S170, the EVSE control electronics 32 disable the current injection between the proximity input conductor 102 and the ground conductor 104. In this configuration, the handle button 55 performs its intended function specified by SAE J1772 and, as represented by block S180 the handle button 55 is in an "off" or non-depressed state. While in this off state, the EVSE control electronics 32 continue to monitor the handle button 55 as activation of the handle button (e.g., opening the contact/button 55 in FIG. 4) would then initiate shutdown of the charging process if not already initiated by a loss of the control pilot.

Alternatively, at block S110 of FIG. 7, if the EVSE control electronics 32 determine that the EV connector 50 is not connected to an EV charging receptacle 70 of an electric vehicle 90, the EVSE control electronics 32 enable the HMI circuit 100 in block S120 and, in block S130, enable current injection between the proximity input conductor 102 and the ground conductor 104 (see, e.g., FIG. 6). In this configuration, with the HMI circuit 100 enabled, the comparator 120 compares the voltage difference between the proximity input conductor 102 and the ground conductor 104 and outputs this differential to the EVSE control electronics 32. If the voltage differential is determined to be greater than a predetermined threshold, as represented by block S140, the handle button 55 is in an "on" or activated state, as represented in block 150. The predetermined threshold is arbitrary. In the example above, wherein the "on" or activated state corresponds to a comparator 120 output voltage of 0.48V and the "off" or de-activated state corresponds to a comparator output voltage of 0.15V, the threshold may be set at, for example, any comparator 120 output voltage above a fixed threshold (e.g., above 0.20V) or between any specified values (e.g., between 0.45V-0.50V). While the HMI circuit 100 is enabled, the EVSE control electronics 32 continues to continuously monitors the EV connector 50 (e.g., via the control pilot signal) to determine if it is connected to an EV charging receptacle 70 of an electric vehicle.

In accord with the above, the EV connector 50 handle button 55 can provide control inputs to the EVSE control electronics 32, which can be used to select a selectable option displayed on a display or other output device of the EVSE 30 and/or to navigate between a plurality of options displayed on a display or other output device of the EVSE 30 and to further effect selection between such options. For example, an EVSE 30 is configured to display on an EVSE display (e.g., a touch screen display, an LCD display, an LED display, etc.) charging-related choices or options to the user and the user can use the handle button 55 to navigate through and/or select one or more of the choices or options simply by activating (e.g., pressing, sliding, etc.) the handle button. When the EV connector 50 is not connected to an EV charging receptacle 70 of an electric vehicle 90, as determined by the control pilot signal, for example, activation of handle button 55 by the user causes an output of the HMI circuit 100 to change (e.g., a higher voltage) informing the EVSE control electronics 32 of the user input. Where this user input is evaluated by the EVSE control electronics 32 in view of a displayed option (e.g., a selectable option), the EVSE control electronics take this input as a selection of the displayed option.

Moreover, further to simply allowing a single input, such as a selection of a single displayed option, which itself provides a new human machine interface, the HMI circuit 100 further broadens the human machine interface capabilities of the EVSE charging system by enabling the handle button to provide multiple, contextual inputs, such as navigation through a number of display options and/or sub-options.

Figure 8A:
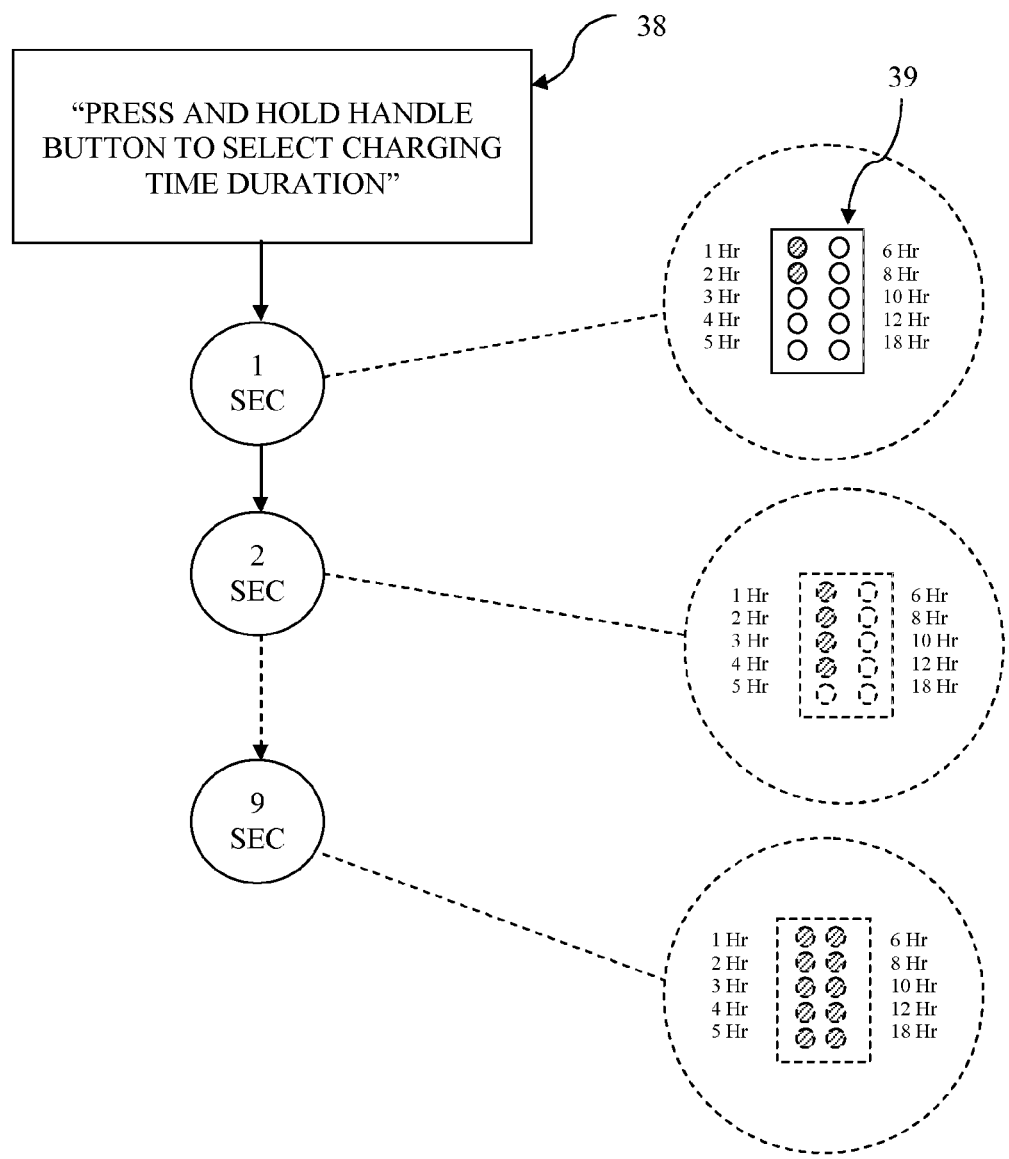
FIGS. 8A-8B depict a sequence of simulated screenshots of an EVSE display device depicting examples of a user interaction with the EVSE using an EV connector handle button in combination with an HMI circuit in accord with at least some aspects of the present concepts.

For example, as shown in FIG. 8A, one EVSE user option may include an option to set a charging time and the user is provided with a plurality of selectable values such as, but not limited to, 1.0 hour, 2.0 hours, 3.0 hours, 4.0 hours, 5.0 hours, 6.0 hours, 8.0 hours, 10.0 hours, 12.0 hours, and 18.0 hours. By way of example, a prompt to the user is displayed on an EVSE display 38 for the user to press and hold to select a desired charging time until a desired selectable value is highlighted by a navigation aid (e.g., an illuminated LED), with the duration of the activation of the handle button 55 corresponding to the desired setpoint (e.g., each 0.5 seconds of handle button activation corresponding to 1.0 hr of charging time). As shown in the example of FIG. 8A, after one second of handle button 55 activation, a secondary EVSE display 39 comprising LEDs shows that two LEDs are illuminated, corresponding to a charging time of 2 hours. As the user continues to hold the handle button 55, at two seconds the secondary EVSE display 39 shows that four LEDs are illuminated, corresponding to a charging time of 4 hours. This may be continued to a maximum time of 5 seconds in the depicted example, which provides a charging time of 18 hours. Once the user releases the handle button 55, allowing it to return to a deactivated state, the user input is applied, as appropriate, by the EVSE control electronics 32.

In yet another variant, a navigation input delay feature may be integrated into the EVSE control electronics 32, for example, so that multiple activations are treated as a single navigation input so long as the delay between activations does not exceed a predetermined threshold. For example, a threshold delay is set to be 2.0 seconds. A user desiring a charging time of 8.0 hours may initially activate the handle button 55 for 3 seconds to yield an indicated time of 6.0 hours, release the handle button for one second (less than the threshold delay), and then re-activate the handle button 55 for another 2 seconds to yield an indicated time of 8.0 hours prior to release of the handle button. Once the user releases or de-activates the handle button 55, and the threshold delay period of 2 seconds has lapsed without an additional input, the activation periods are summed and treated as a single navigation input.

Figure 8B:
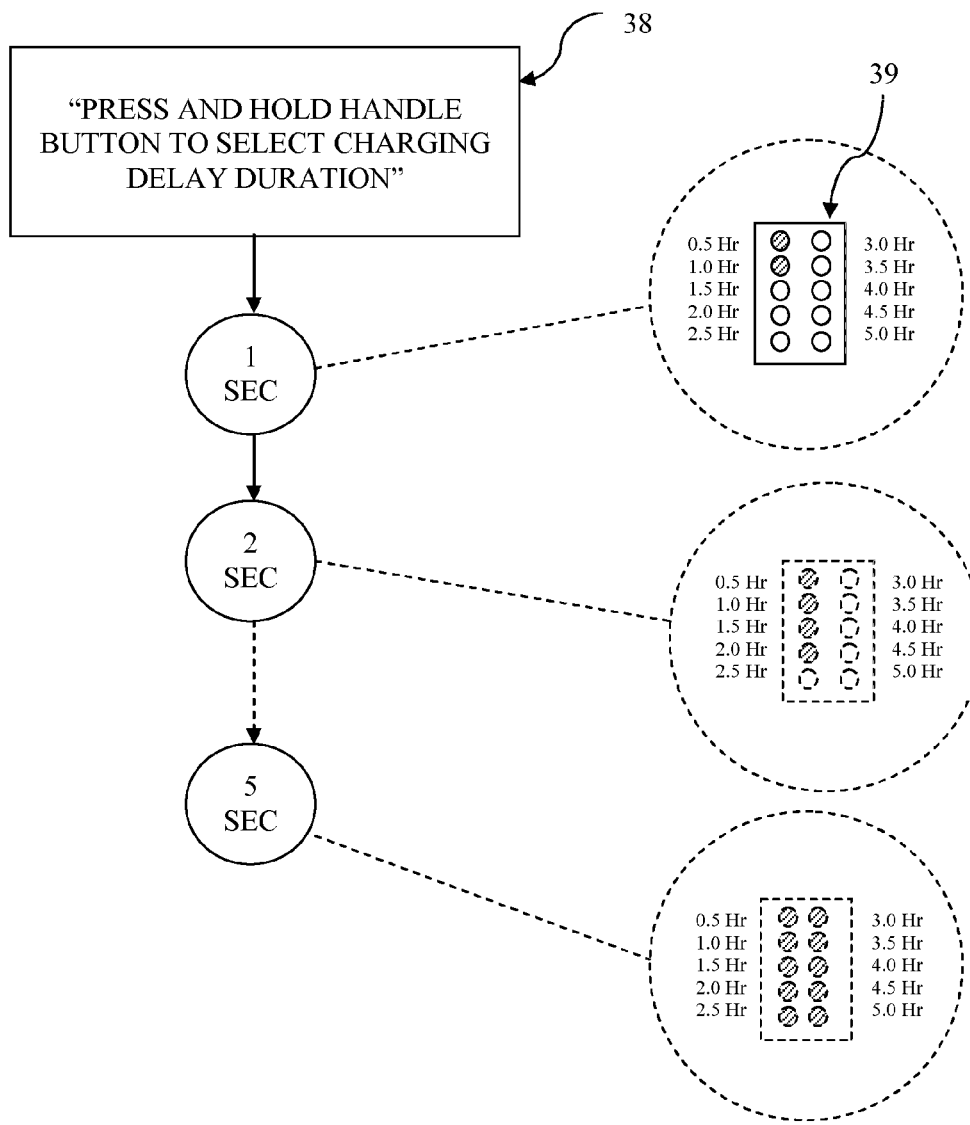

As another example, as shown in FIG. 8B, another EVSE user option may include an option to set a charging delay option and the user is provided with selectable values such as, but not limited to, 15 minutes, 30 minutes, 45 minutes, 1.0 hour, 1.5 hours, 2.0 hours, 2.5 hours, 3.0 hours, 3.5 hours, 4.0 hours, 4.5 hours, 5.0 hours, 5.5 hours, and 6.0 hours. By way of example, a prompt to the user is displayed on an EVSE display 38 for the user to press and hold to select a desired charging delay time, with the duration of the activation of the handle button 55 corresponding to the desired selectable value (e.g., each 1.0 seconds of handle button activation corresponding to 1.0 hr of charging delay time). As shown in the example of FIG. 8B, after one second of handle button 55 activation, a secondary EVSE display 39 comprising LEDs shows that two LEDs are illuminated, corresponding to a charging delay time of 1 hour. As the user continues to hold the handle button 55, at two seconds the secondary EVSE display 39 shows that four LEDs are illuminated, corresponding to a charging delay time of 2 hours. This may be continued to a maximum of 5 seconds, in the depicted example, which provides a charging delay time of 5 hours. Once the user releases the handle button 55, allowing it to return to a deactivated state, the user input is applied, as appropriate, by the EVSE control electronics 32.

In the example above, the navigation input required to move the navigation aid 41 (e.g., an illuminated LED) from a first displayed selectable value (e.g., 1 hour) to a second displayed selectable value (e.g., 2 hours) is a continuous activation of the handle button 55. In another variant, a navigation input delay feature may be integrated into the EVSE control electronics 32, for example, so that multiple handle button activations are treated as a single navigation input so long as the delay between activations does not exceed a predetermined threshold (e.g., a threshold delay of 3 seconds). A user desiring a charging delay time of 4.0 hours may initially activate the handle button 55 for 3 seconds to yield an indicated time of 3.0 hours, release the handle button for two seconds (less than the threshold delay), and again activate the handle button for another second to yield a total indicated charging delay time of 4.0 hours. Once the user de-activates the handle button 55, and the threshold delay period of 3 seconds has lapsed without an additional input, the activation periods are summed and treated as a single navigation input with the lapse of the threshold delay period serving as the control input corresponding to the then-highlighted value.

Figure 9:
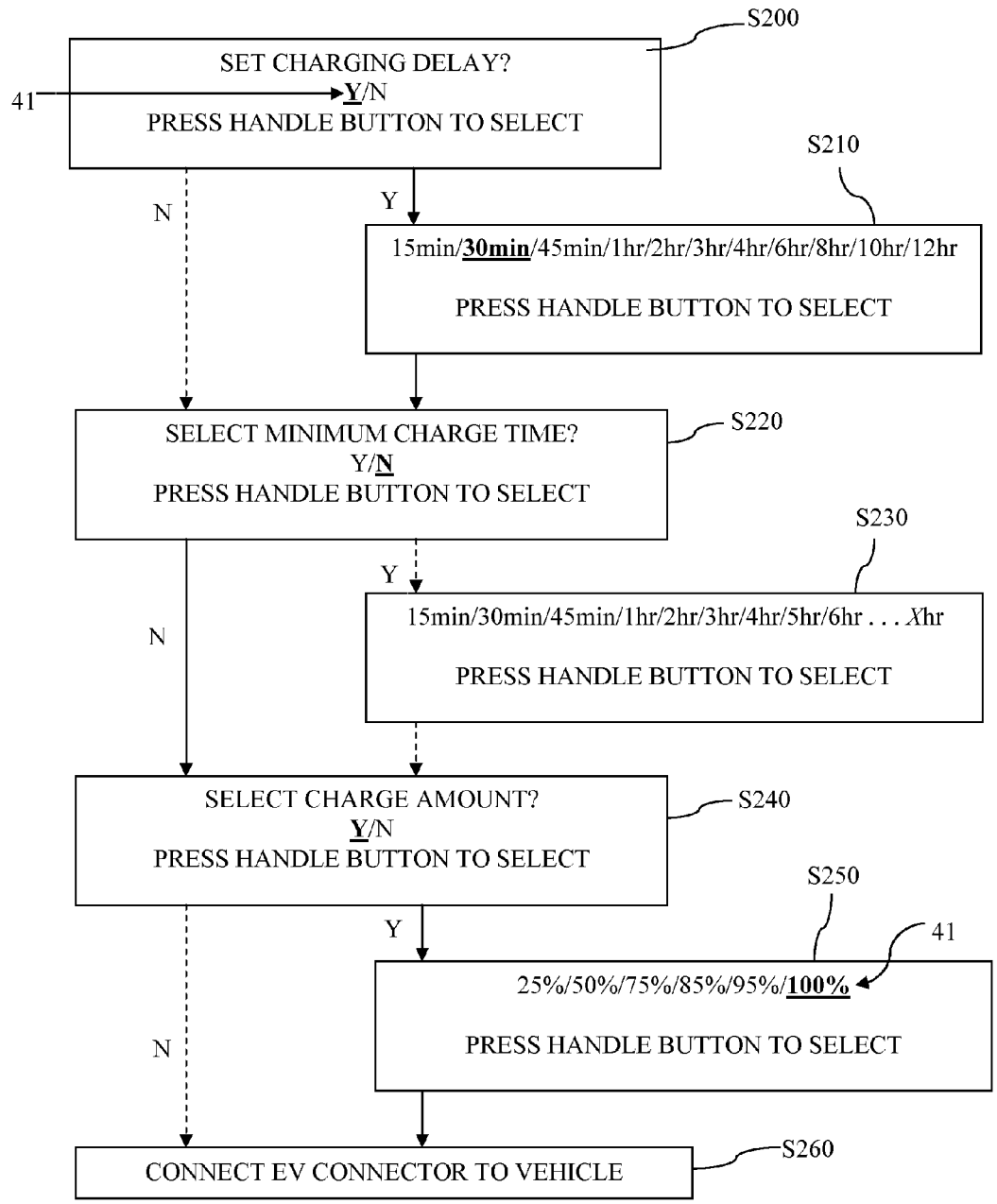
FIG. 9 depicts another simulated sequence of an EVSE display device depicting an example of a user interaction with the EVSE using an EV connector handle button in combination with an HMI circuit in accord with at least some aspects of the present concepts.

In the examples of FIGS. 8A-8B, above, another option is for the EVSE control electronics 32 to permit the user to navigate to a specific desired input using the handle button 55 and to select that desired input by pressing the handle button. By way of example, the EVSE control electronics 32 comprise a memory device bearing an instruction set and one or more controllers (e.g., one or more processors located within the EVSE or external thereto, locally or remotely) electrically connected to the memory device, the controller(s) being configured to execute the instruction set and, upon execution of the instruction set, cause the display device to display, one or more EVSE user options with one or more selectable values. To facilitate navigation between the different selectable values of a presented option, a navigation aid 41 (e.g., a cursor, a line, an arrow, a highlighted background, a blinking light, emphasized text/numerals, etc.) is provided on the display 38, where provided. As shown in FIG. 9, for example, a selectable value that would be selected by activation of the handle button 55 is indicated by a navigation aid 41 of underlined and enhanced characters/numerals. If the I/O display consists of LEDs and does not include a display device such as a touch screen or LCD display, the navigation aid 41 may comprise a blinking LED at a location which would be selected by activation of the handle button 55, such as was illustrated in FIGS. 8A-8B.

In still other aspects of the present concepts, the navigation input comprises an activation of the handle button 55 (e.g., as opposed to example, a lapse of time). In one example of such a configuration, the EVSE control electronics 32 differentiates between a navigation input and a selection input responsive to a period of activation of the EV connector handle button 55. In other words, the EVSE control electronics 32 is configured to associate an activation of the EV connector handle button for a first period of time (e.g., 0.25 seconds) with a navigation input and to associate an activation of the EV connector handle button for a second period of time (e.g., 1 second), different than the first period of time, with a selection input. In general, a navigation input may comprise a first type of activation of the EV connector handle button 55 and a selection input comprises second type of activation of the EV connector handle button. For example, a navigation input may comprise a single activation of the EV connector handle button 55 (e.g., within a predetermined period of time, which could be user-adjustable) and a selection input may comprise a rapid double-activation of the EV connector handle button (e.g., within that same predetermined period of time).

In another aspect of the present concepts, the navigation input comprises an automated movement sequence causing the navigation aid 41 to dwell on a highlighted one of the displayed selectable values for a predetermined period of time (e.g., 0.5 seconds, 1 second, 1.5 seconds, 2.0 seconds, etc.) before automatically moving to highlight a next displayed selectable value for the predetermined period of time and so on, repeating the cycle as necessary until an activation of the EV connector handle button 55 selects a selectable value highlighted by the navigation aid.

The HMI circuit 100 thus adds additional functionality to the EV connector handle button 55 that does not currently exist. By informing the EVSE 30 of the state of the EV connector handle button even when the EV connector 50 is not connected to the EV charging receptacle 70 of an electric vehicle 90, the HMI circuit 100 enhances the human-machine interface with the EVSE 30. There are no limitations to the actual EVSE options that can be utilized in combination with the HMI circuit 100. By way of illustration and not limitation, EVSE user options that can advantageously utilize the additional functionality available through the HMI circuit 100 may include any combination of a charging delay, a minimum charge duration, a maximum charge duration, a fixed charge duration, a minimum charge cost, a maximum charge cost, a payment option (e.g., a first payment plan, a second payment plan, etc.), a rate structure, charging optimization options, an instruction to extend an EV connector cable, or an instruction to retract an EV connector cable. A fixed charge duration, by way of example, could include charge durations of any combination of 15 minutes, 20 minutes, 30 minutes, 40 minutes, 45 minutes, 1.0 hour, 1.5 hours, 2.0 hours, 2.5 hours, 3.0 hours, 3.5 hours, 4.0 hours, 4.5 hours, 5.0 hours, 5.5 hours, 6.0 hours, 6.5 hours, 7.0 hours, 7.5 hours, or 8.0 hours.

In still other aspects, the HMI circuit 100 may simply assign a single added function to the EV connector handle button 55, whereupon activation of the handle button causes the specific function to implement. For example, activation of the EV connector handle button 55 while the EV connector 50 is not connected to an EV charging receptacle directly unlocks an EV connector cable to permit the cable to then move freely. As another example, activation of the EV connector handle button 55 while the EV connector 50 is not connected to an EV charging receptacle 70 directly causes an EV connector cable to retract (e.g., releasing a latch holding a spring-biased reel, activating a motor to cause rotation of a reel about which the cable is wound, etc.).

FIG. 9 shows another example of an EVSE 30 using an EV connector handle button 55 in combination with an HMI circuit 100 in accord with at least some aspects of the present concepts. In this example, the EVSE control electronics 32 are configured to permit the user to navigate through a plurality of EVSE options displayed on an EVSE display (e.g., 38), each of the options including a plurality of selectable values (e.g., "Yes" or "No", etc.) using the handle button 55. By way of example, navigation between the different selectable values of a presented option, such as the charging delay option in block S200, may be by differentiated handle button 55 activation inputs such as, for example, a single activation within a fixed time to highlight the next selectable value with the navigation aid 41 and a double-activation within a fixed time to select the highlighted selectable value. As shown, the "Y" selectable value is highlighted by the navigation aid 41 and the user is shown to have selected the "Y" selectable value by virtue of the solid line "Y" leading to block S210 (e.g., the non-selected path is indicated by a dashed line). At block S210, the user is presented with a variety of charging delay selectable values. The user is shown to highlight and select the "30 Min" value from the available selectable values, by appropriate manipulation of the handle button 55 while the while the EV connector 50 is not connected to an EV charging receptacle 70. The EVSE then displays another EVSE option to the user, "Select Minimum Charge Time," in block S220, and selectable values of "Y" and "N" are displayed. As shown, the "N" selectable value is highlighted by the navigation aid and the user is shown to have selected the "N" selectable value by virtue of the solid line, thus bypassing selection of the minimum charge time selectable values available in block S230.

The EVSE then displays still another EVSE option to the user, "Select Charge Amount," in block S240, and selectable values of "Y" and "N" are displayed. At block S250, the user is presented with a variety of charge amount selectable values (e.g., 25%, 50%, 75%, 85%, 95%, 100%, although other or additional values could be presented). The user is shown to highlight and select the "100%" value from the available selectable values, by appropriate manipulation of the handle button 55 while the EV connector 50 is not connected to an EV charging receptacle 70. In block S260, however, the EV connector 50 is connected to an EV charging receptacle 70 and the HMI circuit 100 is disabled, as shown by FIG. 7 and as described above.

While particular embodiments and applications of the present concepts have been illustrated and described, it is to be understood that the concepts disclosed herein are not limited to the precise construction and compositions disclosed herein and that various modifications, changes, and variations can be apparent from the foregoing descriptions without departing from the spirit and scope of the invention as defined in the appended claims. By way of example, the present concepts are applicable not only to the exemplary standard (SAE J1772 (October 2012 Rev.)) disclosed herein, but may also advantageously be incorporated with other charging systems both domestically and internationally including, but not limited to charging systems based on the Mennekes Type-2 or CHAdeMO standard.

What is claimed is:

1. Electric vehicle supply equipment (EVSE) comprising:
   EVSE control electronics configured to receive a control pilot signal indicating whether an EV connector is plugged into an EV charging receptacle;
   an EV connector comprising a proximity detection circuit, the proximity detection circuit including a handle button configured to control a latch for holding the EV connector in the EV charging receptacle and a proximity signal input line to the electric vehicle supply equipment; and an HMI (Human Machine Interface) circuit comprising:
- a proximity input terminal configured to receive a proximity signal from an EV connector indicating a state of the handle button of the EV connector when the control pilot signal indicates that the EV connector is not connected to the EV charging receptacle;
- a ground terminal;
- a current source having a control input coupled between the proximity input terminal and the ground terminal;
- a comparator connected between the proximity input terminal and the ground terminal to provide an output representing a state of the handle button when the current source is activated by the control input; and
- an output terminal to which the output of the comparator is connected, the output terminal being connected to the EVSE control electronics, wherein the state of the handle button is utilized as an input to the HMI circuit.

2. The electric vehicle supply equipment according to claim 1,
wherein the EVSE control electronics cause the current source to provide a predetermined current to the control input of the current source only when the control pilot signal indicates that the EV connector is not plugged into the EV charging receptacle.

3. The electric vehicle supply equipment according to claim 1,
wherein the EVSE control electronics disable the HMI circuit responsive to connection of the EV connector to an electric vehicle, and
wherein the EVSE control electronics are configured to enable the HMI circuit responsive to a determination that the EV connector is not connected to an electric vehicle.

4. The electric vehicle supply equipment according to claim 3,
wherein the output of the comparator corresponds to a first voltage when the handle button of the EV connector is activated, and
wherein the output of the comparator corresponds to a second voltage when the handle button of the EV connector is not activated, the first voltage being different from the second voltage.

5. The electric vehicle supply equipment according to claim 4, further comprising:
- a display device,
- a memory device bearing an instruction set;
- a controller electrically connected to the memory device, the controller being configured to execute the instruction set and, upon execution of the instruction set, cause the display device to display one or more EVSE user options, wherein one or more EVSE user options are displayed responsive to activation of the EV connector handle button when the HMI circuit is enabled.

6. The electric vehicle supply equipment according to claim 5,
wherein the controller is further configured, upon execution of the instruction set, to display on the display device, a navigation cursor in relation to a plurality of displayed EVSE user options, and
wherein selection of a EVSE user option highlighted by the navigation cursor is effected by activation of the EV connector handle button.

7. The electric vehicle supply equipment according to claim 6,
wherein the EVSE user options comprise at least one of a charging delay, a minimum charge time, a charge cost, an instruction to extend an EV connector cable, and an instruction to retract the EV connector cable.

8. Electric vehicle supply equipment (EVSE) comprising:
EVSE control electronics;
an EV connector comprising a proximity detection circuit, the proximity detection circuit comprising a handle button configured to control a latch for holding the EV connector in an EV receptacle and disposed between a proximity detection terminal and a ground terminal of the EV connector, the EV connector proximity detection circuit configured to detect a connection between the EV connector and an electric vehicle and to output a signal to the EVSE control electronics indicative of the connection; and
a HMI (Human Machine Interface) circuit comprising a comparator circuit connected between a proximity input terminal and a ground terminal of the HMI circuit and having an output connected to an output terminal of the HMI circuit, the output terminal being coupled to an input of the EVSE control electronics, the comparator circuit being configured to indicate a state of activation of the handle button of the EV connector, and the HMI circuit configured, when the EV connector is not connected to an EV receptacle of an electric vehicle, to output a first output when the handle button of the EV connector is activated and to output a second output when the handle button of the EV connector is not activated.

9. The electric vehicle supply equipment according to claim 8, wherein the HMI circuit comprises a current injector configured to inject a current between the ground terminal and the proximity input terminal.

10. The electric vehicle supply equipment according to claim 9, wherein activation of the handle button of the EV connector causes a predetermined function to implement.

11. The electric vehicle supply equipment according to claim 10, wherein the predetermined function is retraction of an EV connector cable.

12. The electric vehicle supply equipment according to claim 10, wherein the predetermined function is one of extension of or unlocking of an EV connector cable.

13. The electric vehicle supply equipment according to claim 9, further comprising:
- a display device,
- a memory device bearing an instruction set;
- a controller electrically connected to the memory device, the controller being configured to execute the instruction set and, upon execution of the instruction set, cause the display device to display one or more EVSE user options, wherein one or more EVSE user options are displayed responsive to activation of the EV connector handle button when the EV connector is not connected to an EV receptacle of an electric vehicle, and
wherein each of the one or more EVSE user options includes a plurality of selectable values.

14. The electric vehicle supply equipment according to claim 13, wherein a selection of a displayed one of the plurality of selectable values is effected by activation of the handle button of the EV connector.

15. The electric vehicle supply equipment according to claim 13, wherein the controller is further configured, upon execution of the instruction set, to display on the display device a navigation aid in relation to a first displayed selectable value of the plurality of selectable values, wherein a navigation input moves the navigation aid from the first displayed selectable value to a second displayed selectable value.

16. The electric vehicle supply equipment according to claim 15, wherein the navigation input comprises an activation of the handle button, wherein the EVSE control electronics differentiates between a navigation input and a selection input responsive to a period of activation of the EV connector handle button, wherein the EVSE control electronics is configured to associate an activation of the EV connector handle button for a first period of time with a navigation input, and wherein the EVSE control electronics is configured to associate an activation of the EV connector handle button for a second period of time, different than the first period of time, with a selection input.

17. The electric vehicle supply equipment according to claim 15, wherein the navigation input comprises an automated movement sequence causing the navigation aid to dwell on a highlighted one of the displayed selectable values for a predetermined period of time before automatically moving to highlight a next displayed selectable value, and wherein an activation of the EV connector handle button selects the displayed selectable value highlighted by the navigation aid.

18. The electric vehicle supply equipment according to claim 15, wherein a navigation input comprises a single actuation of the EV connector handle button, and wherein a selection input comprises a rapid double-actuation of the EV connector handle button.

19. The electric vehicle supply equipment according to claim 13, wherein the one or more EVSE user options comprise at least one of a charging delay, a minimum charge time, a charge cost, and an instruction to retract an EV connector cable.

* * * * *